(12) United States Patent
Fall

(10) Patent No.: US 8,240,082 B1
(45) Date of Patent: Aug. 14, 2012

(54) CHECK VALVE FOR INSECT TRAPS

(76) Inventor: Kenneth G. Fall, Torrance, CA (US)

( * ) Notice: Subject to any disclaimer, the term of this patent is extended or adjusted under 35 U.S.C. 154(b) by 313 days.

(21) Appl. No.: 12/661,831

(22) Filed: Mar. 25, 2010

(51) Int. Cl.
*A01M 1/06* (2006.01)
*A01M 1/08* (2006.01)

(52) U.S. Cl. .............. 43/139; 43/113; 43/132.1; 43/138

(58) Field of Classification Search .................... 43/113, 43/124, 132.1, 133, 138, 139
See application file for complete search history.

(56) References Cited

U.S. PATENT DOCUMENTS

| | | | | |
|---|---|---|---|---|
| 2,931,127 A * | 4/1960 | Mayo | | 43/139 |
| 3,305,965 A * | 2/1967 | Cornell, III | | 43/139 |
| 3,987,578 A * | 10/1976 | Rueff | | 43/139 |
| 4,282,673 A * | 8/1981 | Focks et al. | | 43/113 |
| 5,329,725 A * | 7/1994 | Bible | | 43/113 |
| 5,647,164 A * | 7/1997 | Yates | | 43/139 |
| 5,669,176 A * | 9/1997 | Miller | | 43/139 |
| 5,813,166 A * | 9/1998 | Wigton et al. | | 43/107 |
| 6,145,243 A * | 11/2000 | Wigton et al. | | 43/139 |
| 6,675,528 B2 * | 1/2004 | Jablin | | 43/139 |
| 6,718,685 B2 * | 4/2004 | Bossler | | 43/107 |
| 6,817,139 B1 * | 11/2004 | Powell et al. | | 43/113 |
| 7,243,458 B2 * | 7/2007 | Miller et al. | | 43/139 |
| 2006/0123694 A1 * | 6/2006 | Welch | | 43/113 |

* cited by examiner

*Primary Examiner* — David Parsley
(74) *Attorney, Agent, or Firm* — Don Finkelstein

(57) ABSTRACT

An insect trap having a cylindrical tubular body with a top end and a bottom end and an oval flexible flapper removably mounted in regions adjacent the bottom end whereby the peripheral edge of the flapper is in contact with the inside surface of the body for the condition of no air blowing down the body and the peripheral edge of the flapper spaced from the inside surface of the body for the condition of air blowing down the body.

14 Claims, 2 Drawing Sheets

CHECK VALVE FOR INSECT TRAPS

BACKGROUND OF THE INVENTION

1. Field of the Invention

This invention relates to the insect trap art and more particularly to the traps utilized to retain insects therein for further examination to determine, for example, the types of insects that are in a specific geographical location.

2. Description of the Prior Art

Insect traps of various kinds and configurations have been widely used to determine the particular types of insects that are in a given geographical area at a particular time. In some prior art insect traps, such as the Center for Disease Control (CDC) insect traps which are operated by a 6 volt battery electrical supply, the traps are operated at night from dusk to dawn. The user of these traps must visit the traps on at regular intervals to replace the batteries and retrieve the insects captured by the trap. However, if the battery power is lost between the visits, or there is some other planned shutdown, the insects in the traps may escape through the trap entrance.

In order to overcome the deficiencies of such CDC traps, there has heretofore been utilized a battery powered insect trap having a battery powered light source mounted above the trap body which, for example, may be a section of an acrylic tube. A fan is mounted in the trap body in close proximity to the top of the trap body to blow ambient air downwardly through the trap body thereby creating a low pressure area adjacent the top of the trap body. As the light attracts insects to the area in the vicinity of the top of the trap body, the insects are caught in the downwardly flowing air generated by the fan and are moved axially downwardly towards the bottom of the trap body. A mesh catch bag is connected to the bottom of the trap body and the downwardly flowing air, which carries the insects therein that have been attracted by the light source, flows out of the mesh bag and the insects are contained in the mesh bag.

In order to prevent the escape of the insects out of the top of the trap body in the event the fan becomes inoperable due to loss of battery power or otherwise, these prior insect traps were provided with a bridge extending diametrically across the inside of the trap body and secured by glue to the inside surface of the trap body at the bottom thereof. A flexible flapper, which often was a thin sheet of mylar film, was secured to the bridge and the flexible flapper had a diameter substantially the same as the diameter of the inside of the tap body. While the fan was operating and blowing air down the trap body, the flexible flapper bends about the bridge and the peripheral edges of the flexible flapper are moved out of contact with the inside surface of the trap body to allow the air flow and the insects contained therein to flow into the mesh bag. When the fan was not operating the flexible flapper would return to the condition where the peripheral edges were in contact with the inside surface of the trap body, thereby preventing the insects from moving upwardly in the trap body and escaping from the top thereof.

In some applications, however, it was found that insects could push their way past the flexible flapper at the peripheral edge on the inside surface of the trap body and thus migrate up the trap body and escape from the top. Similarly, because of manufacturing tolerances or distortion of the flexible flapper over time it was found that in some applications there was not a perfect engagement of the peripheral edge of the flexible flapper with the inside surface of the trap body thereby providing a path to allow the insects to escape. Further, it has been found that the width of the bridge often prevented full contact of the peripheral edge of the flexible flapper with the inside surface of the trap body.

Since the flexible flapper was permanently affixed to the bridge and the bridge was permanently secured to the trap body, if there were to be damage to the flexible flapper or the bridge, the entire trap body required replacement.

Thus, there has long been a need for an insect trap in which the trapped insects are more substantially prevented from escaping from the trap once contained within the trap. Also, it has long been desired that the damage to a small portion of the components of the trap did not require replacement of a major portion of the trap.

Accordingly, it is an object of the present invention to provide an improved insect trap.

It is another object of the present invention to provide an improved insect trap in which once an insect is trapped therein, the opportunities for escape of the insect from the trap are substantially reduced.

It is another object of the present invention to provide an improved insect trap in which damage to small portion of the overall components of the trap does not require replacement of the entire trap.

SUMMARY OF THE INVENTION

The above and other objects of the present invention are achieved, in a preferred embodiment thereof are achieved in a preferred embodiment of the present invention by providing a body member having a generally tubular cylindrical wall configuration having a preselected axial length. The body member has a top edge and a bottom edge and a preselected wall thickness. The body member may be fabricated from a clear acrylic tube on the order of 3½ inches in diameter. A battery operated fan and, if desired, a light that emits electromagnetic radiation in a preselected wavelength or group of wavelengths may be mounted at regions adjacent the top of the body member for blowing ambient air into the body member in a downward direction from the top edge towards the bottom edge.

The body member has a pair of slots in diametrically opposed relationship in regions adjacent the bottom edge of the body member. The slots extend partially through the body member from the inner surface towards the outer surface. A bridge member is snugly and removably mounted in the slots on the body member by screws extending through the wall of the body member and into the bridge. In preferred embodiments of the present invention, the top edge of the bridge is narrower in width than the width of the remainder of the bridge.

A flexible flapper member is mounted on the top edge of the bridge. The flexible flapper member is generally oval in shape and has a minor axis slightly smaller than the inside diameter of the body member and a major axis slightly greater than the inside diameter of the body member. For example, for a trap body having an outside diameter of 3.50 inches and a wall thickness of 0.125 inches the inside diameter if the trap body is 3.25 inches. The flexible flapper is oval with a minor diameter of 3.22 inches and a major diameter of 3.33 inches. As a result of the oval configuration, the flapper member will remain in a concave downward configuration with the peripheral edge against the inner surface of the body member, in preferred embodiments of the present invention, which provides improved flap deflection and a better seal to prevent trapped insects from escaping during certain operating conditions of the trap. The narrow width of the top of the bridge member provides greater deflection of the flexible flap and thus improved sealing of the trap.

The flexible flapper member may be fabricated from a thin sheet of mylar, for example on the order of 0.002 inches thick. It has been found that this thickness of the flapper member provides the desired operation in the present invention. If the flexible flapper or the bridge were to become damaged or distorted during use, the bridge and the flexible flapper may be easily removed and replaced with a new assembly thus saving the cost of replacing the entire trap.

A mesh catch bag is mounted on the body member at the top edge of the mesh bag in regions adjacent the bottom edge of the body member and the mesh bag extends any desired axial length to hold the insects trapped in the trap. A cup shaped member may be attached to the bottom edge of the mesh bag to provide a weight sufficient to extend the mesh bag to the desired axial length thereof as well as hold the trapped insects in the mesh bag.

In operation, the light and the fan are generally left in a non-operating condition thereof so that the fan and the light are not turned "on". At dusk, or any other desired time, the light and the fan are turned "on". The light attracts particular insects, and the fan is blowing air axially downward from the top of the body member thereby creating a suction or lower pressure at the top edge of the body member. The insects attracted by the light are drawn into the trap and carried downward by the sir flow. The air flow deflects the flexible flap so the peripheral edge is not in contact with the inside surface of the body member for substantial portions thereof and the insects are carried into the mesh bag. As long as the fan is blowing the air downwardly, the insects cannot escape from the mesh bag. When the fan is turned "off", the peripheral edge of the flexible flapper member returns to a position of engagement with the inside surface of the body member thereby preventing insects from escaping from the mesh bag through the top of the body member.

BRIEF DESCRIPTION OF THE DRAWING

The above and other embodiments of the present invention my be more fully understood from the following detailed description taken together with the accompanying drawing wherein similar reference characters refer to similar elements throughout and in which.

DESCRIPTION OF THE PREFERRED EMBODIMENTS

Figure 1:
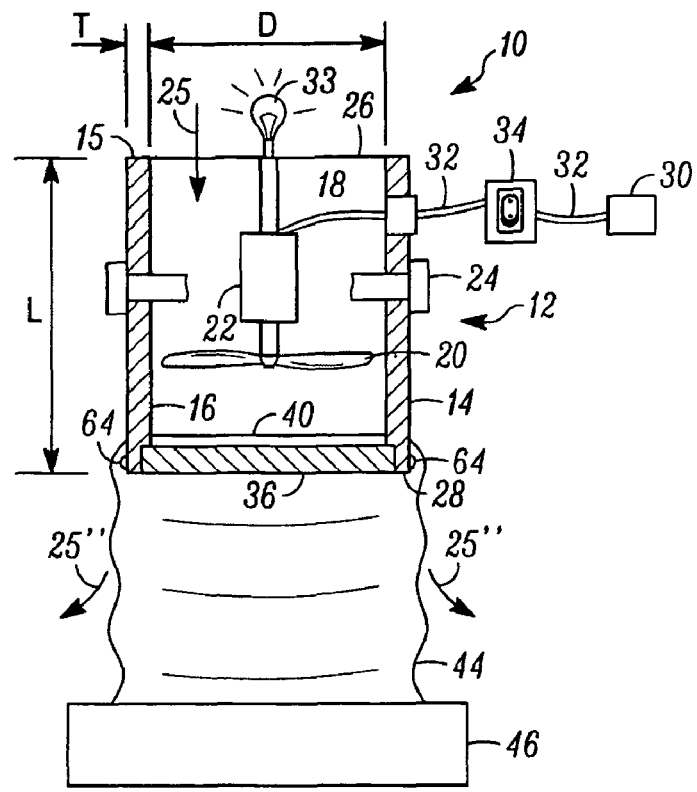
FIG. 1 depicts a preferred embodiment of the present invention.

Referring now to the drawing, there is illustrated in FIG. 1 a preferred embodiment, generally designated 10, of an insect trap 12 according to the principles of the present invention. the trap 12 has a body member 14 which may be made of a clear acrylic tube of 3.50 inches in outside diameter and a 0.25 inch wall thickness indicated at "T" of the body wall 15 to provide a 3.25 inch inside diameter indicated at "D" at the inside surface 16 of the body member 14 defining a volume 18. The body member 14 has a top 26 and a bottom 28 separated by the axial length indicated a "L" which may be on the order of 3.0 inches to 5.0 inches.

A fan 20 is mounted in the volume 18 between the top 26 and bottom 28 of the body member 14 and the fan 20 is powered by an electrical motor 22 supported in the volume 18 by a bracket 24 extending through the wall 15. The motor 22 is powered by batteries indicated at 30 through wires 32 and there may also be provided an "ON-OFF" switch indicated at 34. For the condition of the fan in the "ON" condition, air is drawn by the fan 20 and is driven downwardly in the body member 14 as indicated by the arrow 25.

An electrically powered light source as indicated at 33 is mounted in regions near the top 26 of the body member 14 and emits electromagnetic radiation in one or more frequencies to attract the desired insect species or multiple species as may be desired in particular applications.

A bridge member 36 is removably mounted in the volume 18 of the body member at the bottom 28 thereof as described below in greater detail in connection with FIGS. 2 and 3. A flexible flapper 40 is mounted, for example by cement, on the top of the bridge 36 as described below, and the flexible flapper is fabricated from a thin sheet of mylar for example on the order of 0.002 inches thick. The relative thickness of the flexible flapper 40 is exaggerated in the various Figures of the drawing for clarity in explanation of the function thereof.

A mesh bag 44 is connected to the body member 14 art the bottom 28 and extends any desired axial length. The mesh bag is air flow porous so that air may pass therethrough but insects inside the mesh bag cannot escape therethrough. A cup like member 46 is connected to the bottom of the mesh bag 44 to help maintain the mesh bag 44 extended to the desired axial length.

Figure 2:
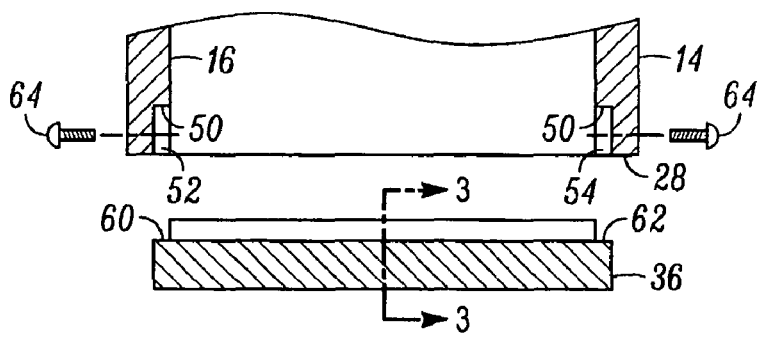
FIG. 2 illustrates a bridge member useful in the practice of the present invention showing the attachment of the bridge to the trap body.
Figure 3:
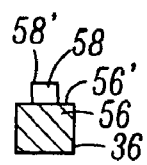
FIG. 3 is a sectional view of the bridge taken along the line 3-3 of FIG. 2.

Referring now to FIGS. 2 and 3, there is illustrated the bridge 32 and its attachment to the body member 14. The flexible flapper is omitted from FIGS. 2 and 3 for clarity. The body member 14 has slot walls 50 defining a pair of slots 52 and 54 in diametrically opposed relationship at the inner surface 16 at the bottom 28 of the body member 14. The bridge 26 has a base portion 56 and a mounting portion 58 at the top 56'. The bridge has shoulder portions 60 and 62 which fit into slots 52 and 54, respectively, and are removably retained therein by screws 64. If the bridge 36 and/or the flexible flapper 40 were to become damaged during use, the screws 64 may be removed, the damaged bridge 36 removed and replaced with a new bridge without the necessity of replacing the entire body member 14 or even the entire trap 12. The flexible flapper 40 is mounted on the top 58' of the mounting portion 58 of bridge 36 by cement or any other desired method of attachment.

Figure 6:
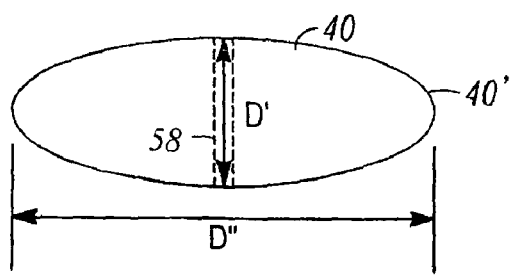

The flexible flapper 40, according to the principles of the present invention, is illustrated in FIG. 6. As shown thereon, the flexible flapper 40 is slightly oval having a minor diameter as indicated at D' and a major diameter as indicated at D". For the above mentioned body member 14 having an inner diameter D of 3.25 inches, the minor diameter D' of the flexible flapper is 3.220 inches slightly less than the inside diameter D' of 3.250 inches and the major diameter D" is on the order of 3.330 inches or slightly larger than the inside diameter of 3.250 inches. The flexible flapper 40 is bonded to the top 58' of the mounting portion 58 of the bridge 36 along the minor diameter D' as indicated by the dotted lines 70. The flexible flapper 40 has a peripheral edge 40' for selectively engaging the inside surface 16 of the body member during non-operation of the fan 20 and separating therefrom throughout a substantial extent thereof during the operation of the fan 20. The oval shape of the flexible flapper 40 provides that in a direction perpendicular to the bridge 36 the flexible flapper is bent downwardly so that the flexible flapper 40 does not lie in a planar position in the volume 18 of the body member 14 but is in an arcuate position. The narrow width of the bonding portion 58 of the bridge 36 allows greater deflection of the flexible flapper 40 therefrom during operation of the fan 20.

Figure 4:
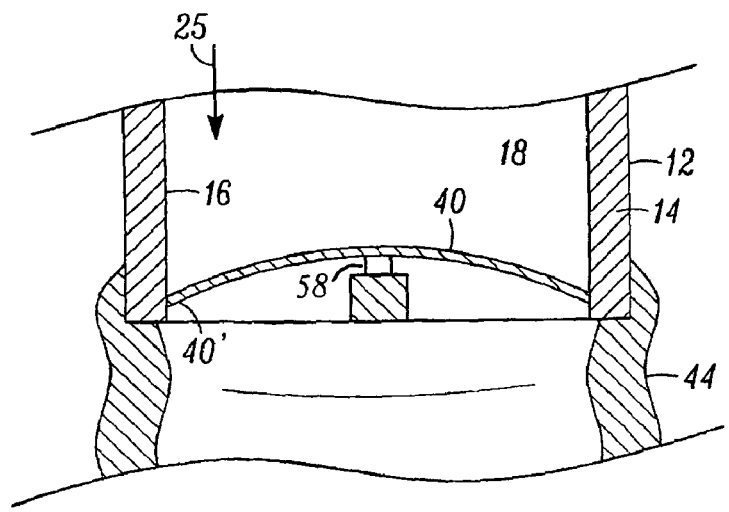
FIG. 4 is a partial sectional view showing the flexible flapper in the sealing position for the condition of the fan not operating and not blowing air downwardly in the trap body.

FIG. 4 is a partial sectional view of regions adjacent the bottom 28 of the body member 14 for the condition of the fan 20 in the "OFF" position and no air is flowing downwardly in the volume 18 in the direction of the arrow 25. As shown, the flexible flapper 40 is in an arcuate configuration and the peripheral edge 40' thereof is in contact with the inside surface 16 of the body member 14. the contact of the peripheral edge 40' with the inside surface 16 of the body 14 prevents insects contained within the mesh catch bag 44 from escaping upwardly to the top 26 and thus from the trap 12.

Figure 5:
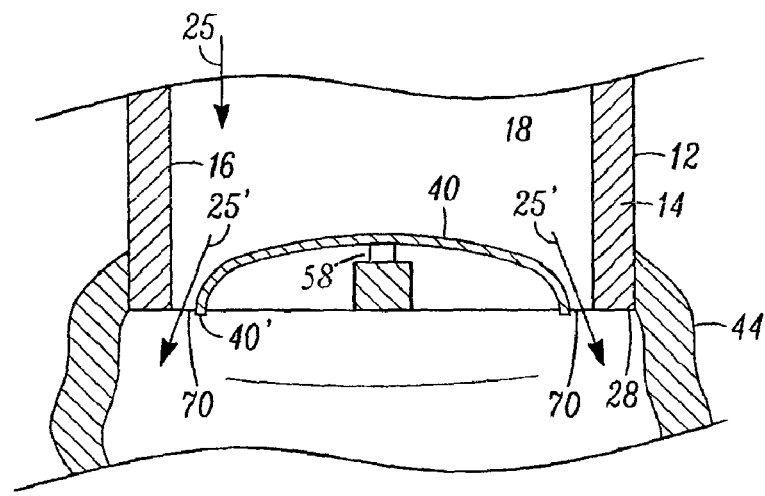
FIG. 5 is a partial sectional view showing the flexible flapper in the free flow position for the condition of the fan operating and blowing air downwardly in the trap; and, FIG. 6 illustrates a flexible flapper useful in the practice of the present invention.

FIG. 5 is a partial sectional view of regions adjacent the bottom 28 of the body member 14 for the condition of the fan 20 in the "ON" condition thereof. As shown, the air driven by the fan 20 in the direction of the arrow 25 deflects the flexible flapper 40 so that the peripheral edge 40' is bent downwardly away from the inside surface 16 to open an air flow passage 70 substantially all around the inside surface 16 so that the air together with any insects therein flows therethrough as indicated by the arrow 25' into the mesh bag 44 and through the porous mesh catch bag 44" to regions external thereof, leaving the insects in the mesh bag 44.

In operation of the trap 12, the fan 20 and the light 33 are turned "ON", usually at dusk and left "ON" until dawn. The light 33 attracts insects thereto and the lowered pressure of the air at the top 26 of the body member 14 sucks the insects into top 26 of the body member 14 from where the insects are carried downwardly by the air flowing in the direction of the arrow 25 past the fan 20, through the opening 70 and into the mesh catch bag 44. The air flows through the mesh catch bag 44 leaving the insects therein. When it is desired to check the contents of the mesh bag 44, if at night, the light 33 and the fan 20 are turned "OFF", the flexible flapper 40 returns to the position shown in FIG. 4 and the trap taken to any desired location for removal of the mesh catch bag 44 and counting of the insects therein.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. An insect trap comprising, in combination:

a body member having a body wall defining a generally tubular cylindrical configuration having a preselected inside diameter and a preselected outside diameter, said body wall having an inside surface and an outside surface with a preselected thickness therebetween, a top edge and a bottom edge spaced a preselected axial distance from said inside top edge;

slot walls defining a pair of slots in said body wall having a preselected slot height and a preselected slot width, said pair of slots extending a preselected slot distance from said inside surface of said body wall towards said outside surface of said body wall, and said pair of slots in diametrically opposed relationship in regions adjacent said bottom edge of said body wall;

a bridge member positionable in said pair of slots having a top edge and a bottom edge with a bridge height therebetween substantially the same as said slot height and said bottom edge of said bridge member substantially coplanar with said bottom edge of said body wall, said bridge member having a base portion having a first width and a top surface, a mounting portion on said top surface; said mounting portion having a second width less than said first width of said base portion of said bridge member, and a mounting surface on said mounting portion and spaced from said top surface of said base portion of said bridge member; and said first width of said base portion of said bridge member substantially the same as said slot width;

screw members extending through said body wall at said slot walls and into said bridge member to removably retain said bridge member in said slots;

a flexible flapper member having a peripheral edge, said flexible flapper member mounted on said mounting surface of said mounting portion of said bridge member and said flexible flapper member having a generally oval shape, said oval shape having a minor diameter slightly smaller than said preselected inside diameter of said body wall and a major diameter slightly greater than said minor.

2. The arrangement defined in claim 1 wherein:

said inside diameter of said body member is on the order of 3.25 inches;

said minor diameter of said flexible flapper member is on the order of 3.22 inches;

said major diameter of said flexible flapper member is on the order of 3.33 inches.

3. The arrangement defined in claim 2 wherein:

said flexible flapper has a thickness on the order of 0.002 inches.

4. The arrangement defined in claim 3 wherein:

said flexible flapper member is bonded to said mounting surface of said mounting portion of said bridge member.

5. The arrangement defined in claim 4 wherein:

said bridge member has a first end portion and a second end portion spaced from said first end portion;

each of said first end portion and a second end portion defining shoulders, and each of said first end portion and a second end portion free of said mounting portion, whereby said shoulders of said bridge member fit in said slats in said body wall of said body member.

6. The arrangement defined in claim 1 wherein:

portions of said peripheral edge of said flexible flapper member engaging said inside surface of said body wall of said body member for the condition of no air blowing through said body member from said top edge toward said bottom edge and portions of said peripheral edge of said flexible flapper member spaced from preselected regions of said inside surface of said body wall of said body member for the condition of air blowing through said body member from said top edge toward said bottom edge.

7. The arrangement defined in claim 2 wherein:

said outside diameter of said body wall of said body member is on the order of 3.50 inches.

8. The arrangement defined in claim 2 wherein:
said second thickness of said mounting portion of said bridge member is on the order of 1/16 inches and said first width of said base portion of said bridge member is on the order of 3/16 inches.

9. An insect trap comprising, in combination:
a body member having a body wall defining a generally tubular cylindrical configuration having a preselected inside diameter and a preselected outside diameter, said body wall having an inside surface defining an air flow volume extending therethrough, and an outside surface with a preselected thickness therebetween, a top edge and a bottom edge spaced a preselected axial distance from said top edge;
an electrically powered fan mounted in said air flow volume and said fan having an "OFF" condition wherein said fan is not operating and an "ON" condition wherein said fan is blowing air downwardly in said airflow volume from said top edge of said body member to said bottom edge of said body member;
a fan motor connected to said fan for rotating said fan;
a mesh catch bag connected to said body member in regions adjacent said bottom edge for receiving air blown through said airflow volume by said fan, and said mesh bag having openings therethrough to allow said air blown into said mesh catch bag to exit said mesh bag to regions external said mesh bag;
an electrically powered light source mounted on said body wall of said body member in regions adjacent said top edge thereof for emitting insect attracting electromagnetic radiation in at least one frequency for attracting insects to regions adjacent said top edge of said body wall of said body member, whereby for the condition of said fan in the "ON" operating condition thereof, a low air pressure is generated in regions adjacent said top edge of said body wall of said body member for flowing with air blown by said fan into said mesh catch bag and said openings in said mesh catch bag too small to let insects escape therethrough;
a source of electrical energy for powering said fan motor and said light source;
slot walls defining a pair of slots in said body wall having a preselected slot height and a preselected slot width, said pair of slots extending a preselected slot distance from said inside surface of said body wall towards said outside surface of said body wall, and said pair of slots in diametrically opposed relationship in regions adjacent said bottom edge of said body wall;
a bridge member positionable in said pair of slots having a base portion having a top edge and a bottom edge with a bridge height therebetween substantially the same as said slot height and said bottom edge of said bridge member substantially coplanar with said bottom edge of said body wall, said bridge member having a base portion having a first width and a top surface, a mounting portion on said top surface; said mounting portion having a second width less than said first width of said base portion of said bridge member, and a mounting surface on said mounting portion and spaced from said top surface of said base portion of said bridge member; and said first width of said base portion of said bridge member substantially the same as said slot width;
screw members extending through said body wall at said slot walls and into said bridge member to removably retain said bridge member in said slots;
a flexible flapper member having a peripheral edge, said flexible flapper member mounted on said mounting surface of said mounting portion of said bridge member and said flexible flapper member having a generally oval shape, said oval shape having a minor diameter slightly smaller than said preselected inside diameter of said body wall and a major diameter slightly greater than said minor.

10. The arrangement defined in claim 9 wherein:
said inside diameter of said body member is on the order of 3.25 inches;
said minor diameter of said flexible flapper member is on the order of 3.22 inches;
said major diameter of said flexible flapper member is on the order of 3.33 inches; and
said preselected distance is in the range of 2 inches to 6 inches.

11. The arrangement defined in claim 10 wherein:
said flexible flapper has a thickness on the order of 0.002 inches.

12. The arrangement defined in claim 10 wherein:
said flexible flapper member is bonded to said mounting surface of said mounting portion of said bridge member.

13. The arrangement defined in claim 9 wherein:
said bridge member has a first end portion and a second end portion spaced from said first end portion;
each of said first end portion and a second end portion defining shoulders, and each of said first end portion and a second end portion free of said mounting portion, whereby said shoulders of said bridge member fit in said slots in said body wall of said body member.

14. The arrangement defined in claim 9 wherein:
portions of said peripheral edge of said flexible flapper member engaging said inside surface of said body wall of said body member for the condition of no air blowing through said body member from said top edge toward said bottom edge and portions of said peripheral edge of said flexible flapper member spaced from preselected regions of said inside surface of said body wall of said body member for the condition of air blowing through said body member from said top edge toward said bottom edge.

* * * * *